(12) United States Patent
Sanderson et al.

(10) Patent No.: US 8,870,120 B2
(45) Date of Patent: Oct. 28, 2014

(54) COMPOSITE STRUCTURE

(75) Inventors: Timothy J. Sanderson, Filton (GB); Stephen Williams, Filton (GB)

(73) Assignee: Airbus Operations Limited, Bristol (GB)

( * ) Notice: Subject to any disclaimer, the term of this patent is extended or adjusted under 35 U.S.C. 154(b) by 232 days.

(21) Appl. No.: 13/401,951

(22) Filed: Feb. 22, 2012

(65) Prior Publication Data

US 2012/0213640 A1 Aug. 23, 2012

(30) Foreign Application Priority Data

Feb. 23, 2011 (GB) .................................. 1103125.9

(51) Int. Cl.
| | | |
|---|---|---|
| *B64C 3/20* | (2006.01) | |
| *B64C 3/26* | (2006.01) | |
| *B64C 3/24* | (2006.01) | |
| *B64C 3/18* | (2006.01) | |
| B29C 70/22 | (2006.01) | |
| B29C 70/20 | (2006.01) | |
| B29L 31/30 | (2006.01) | |

(52) U.S. Cl.
CPC ................ *B64C 3/24* (2013.01); *Y02T 50/433* (2013.01); *Y02T 50/43* (2013.01); *B64C 3/26* (2013.01); *B29C 70/222* (2013.01); *B29C 70/207* (2013.01); *B29L 2031/3082* (2013.01); *B64C 3/185* (2013.01); *B29L 2031/3085* (2013.01)
USPC ..................... 244/123.3; 244/123.1; 244/131; 244/132; 244/133; 428/119; 428/189

(58) Field of Classification Search
USPC ......... 244/119, 123.1, 123.3, 123.12, 123.13, 244/123.8, 123.9, 133, 131, 132; 428/119, 428/189
See application file for complete search history.

(56) References Cited

U.S. PATENT DOCUMENTS

| | | | |
|---|---|---|---|
| 4,811,540 | A | 3/1989 | Kallies et al. |
| 6,190,484 | B1 | 2/2001 | Appa |

(Continued)

FOREIGN PATENT DOCUMENTS

| | | |
|---|---|---|
| DE | 102008013759 A1 | 9/2009 |
| EP | 0248161 A1 | 12/1987 |

(Continued)

OTHER PUBLICATIONS

British Search Report for 1103125.9 dated Jun. 13, 2011.

(Continued)

*Primary Examiner* — Timothy D Collins
*Assistant Examiner* — Nicholas McFall
(74) *Attorney, Agent, or Firm* — Lowe Hauptman and Ham, LLP

(57) ABSTRACT

A composite structure has a first section, a second section, and a curved corner joining the first and second sections. The structure has a stack of fiber-reinforced plies including first and second external plies which run from the first section into the second section on an inside and an outside of the corner, respectively. A discontinuous first internal ply is sandwiched between the first and second external plies so that more of the first internal ply is located within the first section than within the second section. A second internal ply is sandwiched between the first and second external plies. The fibers of the first internal ply run at an angle θ to the fibers of the second internal ply. In some embodiments the angle θ is greater than 3° but less than 20°. In one embodiment the angle θ is between 35° and 42°.

20 Claims, 7 Drawing Sheets

(56) References Cited

U.S. PATENT DOCUMENTS

| | | | |
|---|---|---|---|
| 6,372,072 B1 * | 4/2002 | Healey | 156/148 |
| 2003/0098116 A1 | 5/2003 | Bequet | |
| 2005/0236524 A1 | 10/2005 | Sarh | |
| 2006/0243860 A1 | 11/2006 | Kismarton | |
| 2006/0249626 A1 | 11/2006 | Simpson et al. | |
| 2009/0110871 A1 | 4/2009 | Victorazzo | |
| 2009/0220747 A1 | 9/2009 | Karem | |
| 2009/0261199 A1 | 10/2009 | McCarville et al. | |
| 2010/0230541 A1 | 9/2010 | Benavides et al. | |
| 2011/0095129 A1 * | 4/2011 | Villares et al. | 244/119 |
| 2011/0168324 A1 | 7/2011 | Ender | |

FOREIGN PATENT DOCUMENTS

| | | |
|---|---|---|
| WO | 9932273 A1 | 7/1999 |
| WO | 2005110842 A2 | 11/2005 |

OTHER PUBLICATIONS

Extended European Search Report corresponding to 12156266.4 1103125.9 dated Jul. 10, 2012.

Yosuke Nagao et al., "Low Cost Composite Wing Structure Manufacturing Technology Development Program in JAXA", 16th International Conference on Composite Materials, pp. 1-6 (2007).

Olivier Guillermin, "Computer-Aided Design and Manufacturing", Composits, IPC Business Press Ltd. Haywards Heath, GB, pp. 366-372, Dec. 1, 2001.

Greg Kress et al., "Design Criteria", Composites, ASM International, Materials Park, Ohio, USA, pp. 353-359, Dec. 1, 2001.

Examination Report issued in EP Application No. 12 156 266.4, dated Sep. 4, 2014.

* cited by examiner

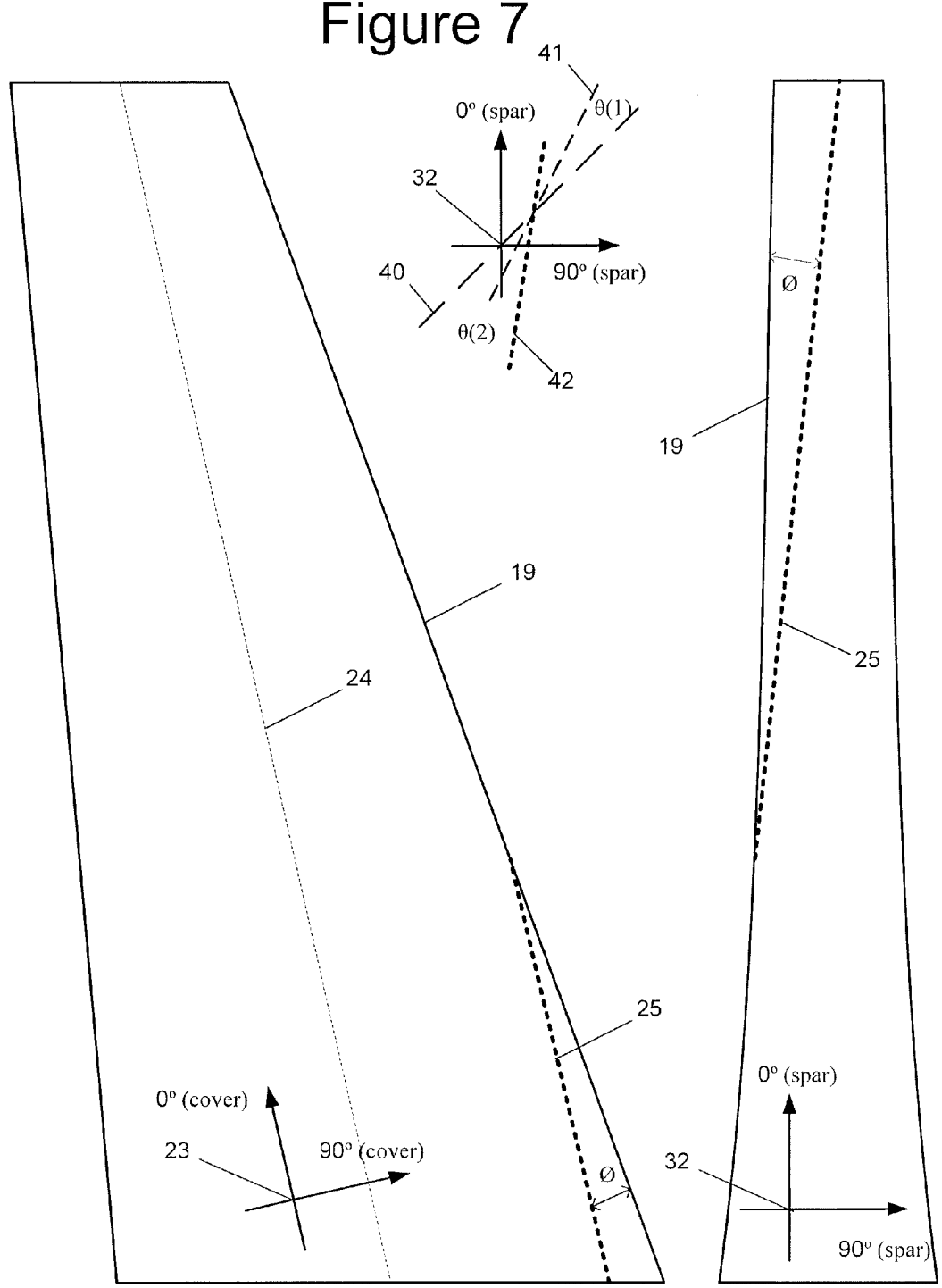

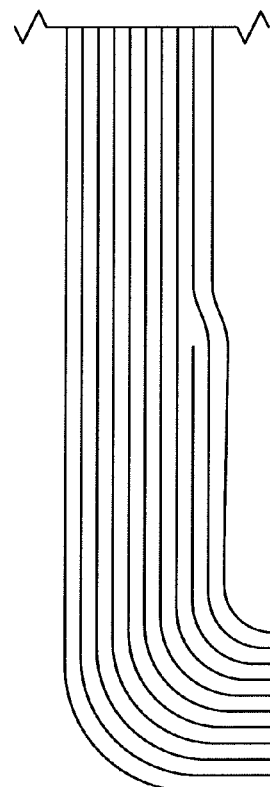
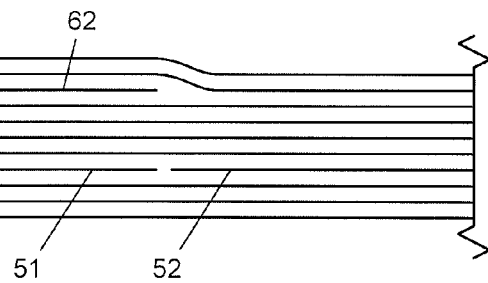
Figure 12
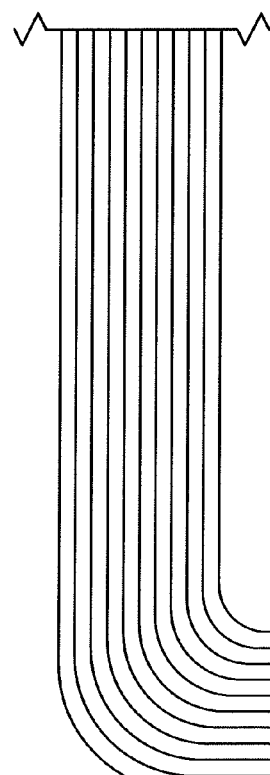
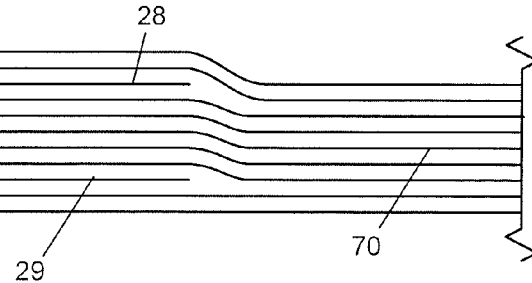
Figure 13

COMPOSITE STRUCTURE

RELATED APPLICATIONS

The present application is based on, and claims priority from, British Application Number 1103125.9, filed Feb. 23, 2011, the disclosure of which is hereby incorporated by reference herein in its entirety.

FIELD OF THE INVENTION

The present invention relates to a composite structure comprising a first section; a second section; and a curved corner joining the first section to the second section, the structure comprising a stack of fibre-reinforced plies.

BACKGROUND OF THE INVENTION

A torque box is a structure with a closed section which can efficiently transmit torsional and bending stresses. Torque boxes are used in a variety of applications, including aerospace and automotive applications. For instance the primary component of an aircraft wing, vertical tail plane and horizontal tail plane is a torque box.

Traditional torque box construction involves a series of processes whereby large components (spars, ribs, covers, stringers, etc) are joined together using mechanical fasteners.

FIG. 1 is a schematic perspective view of a conventional wing box 1. The wing box comprises a front spar 2, a rear spar 3; an upper cover 4 and a lower cover 5, each comprising a stack of fibre-reinforced plies. FIG. 2 shows the front spar 2 and lower cover 5 only. The fibres in the cover 5 are aligned with a cover rosette 6 and the fibres in the spar 3 are aligned with a spar rosette 7 which is generally not parallel with the cover rosette 6.

Each component is optimised for weight by individually tailoring the ply layup for that component. Thus for example a layup for a spar may be 5/7/7/5 (i.e., five 0° plies, seven 45° plies, seven 135° plies, and five 90° plies) while the cover has a layup of the same thickness but more 0° plies (for example 10/6/6/2).

SUMMARY OF THE INVENTION

A first aspect of the invention provides a composite structure comprising a first section; a second section; and a curved corner joining the first section to the second section, the structure comprising a stack of fibre-reinforced plies, the stack including: a first external ply which runs from the first section into the second section round an inside of the corner; a second external ply which runs from the first section into the second section round an outside of the corner; a discontinuous first internal ply which is sandwiched between the first and second external plies and is dropped off inside the structure so that more of the first internal ply is located within the one section than within the other section; and a second internal ply which is sandwiched between the first and second external plies; wherein at least part of the first and second internal plies are both located within the same section, the fibres of the first internal ply run at an angle θ to the fibres of the second internal ply in the section where they are both located, and the angle θ is greater than 3° but less than 20°.

Typically the internal plies are of the same nominal direction relative to a principal axis of the structure (for instance both 0° plies, or both +45° plies). Preferably the angle θ is less than 10°. Thus for example the first internal ply may be a 0° ply with fibres which are approximately aligned (+/−3°) with a length axis of one section; and the second internal ply may be a 0° ply with fibres which are approximately aligned (+/−3°) with a length axis of the other section.

Typically the angle θ is greater than 5°.
Typically the angle θ is less than 10°.

A further aspect of the invention provides a composite structure comprising a first section; a second section; and a curved corner joining the first section to the second section, the structure comprising a stack of fibre-reinforced plies, the stack including: a first external ply which runs from the first section into the second section round an inside of the corner; a second external ply which runs from the first section into the second section round an outside of the corner; a discontinuous first internal ply which is sandwiched between the first and second external plies and is dropped off inside the structure so that more of the first internal ply is located within one section than within the other section; and a second internal ply which is sandwiched between the first and second external plies, wherein at least part of the first and second internal plies are both located within the same section, the fibres of the first internal ply run at an angle θ to the fibres of the second internal ply in the section where they are both located, and the angle θ is between 35° and 42°.

In this further aspect of the invention the internal plies typically have different nominal directions (for instance one being a 0° ply and the other being a +45° ply). Thus for example the first internal ply may be a bias ply with fibres which are aligned at an angle of 45°+/−3° with a length axis of the one section, and the second internal ply may be a 0° ply with fibres which are approximately aligned (+/−3°) with a length axis of the other section.

The first and second aspects of the invention provide a composite structure in which the first and second sections are formed together as a single part, in contrast to the conventional arrangement of FIG. 1 in which the various parts of the structure are formed separately. The layup of one section is tailored compared to the other section by assigning a desired fibre angle to the discontinuous first internal ply.

The fibres of the first internal ply are typically aligned with a first rosette, whereas the fibres of the second internal ply are aligned with a second rosette but not with the first rosette. The angle of deviation between the rosettes may be any desired angle, for instance 7° or more than 10°.

The first and second internal plies may butt up, overlap or not overlap in the section where they are both located.

The first internal ply may be dropped off at the corner or within one section, in which case none of the first internal ply will pass round into the other section. However more preferably good load transfer across the corner is achieved by passing the first internal ply round the corner and dropping it off inside the other section, instead of dropping it off at the corner or within the one section.

Typically the first and second internal plies either overlap with each other or butt up against each other, and the fibres of the first internal ply run at the angle θ to the fibres of the second internal ply at a point where they overlap or butt up against each other.

The first internal ply may be dropped off without being replaced so that the other section is thinner than the corner. Alternatively the second internal ply may be a discontinuous ply. This second discontinuous internal ply enables the layup to be further tailored. The second discontinuous internal ply may be dropped off in the same section as the first internal ply and may also optionally butt up against the dropped off first internal ply. Alternatively the second discontinuous internal ply may run from the second section into the first section round the corner and be dropped off inside the first section so that more of the second internal ply is located within the second section than within the first section; wherein the structure has an increased thickness where the first and second internal plies overlap. The increased thickness at the corner provides improved load transfer and reinforcement at the corner. Preferably the first external ply has a ramp where the first internal ply is dropped off and the second external ply has a ramp where the second internal ply is dropped off. Providing the ramps on opposite sides of the stack in this fashion enables the structure to have a substantially planar external surface where this is desirable.

The first internal ply may for example be a 0° ply with fibres which are substantially aligned with a length axis of the structure, or a bias ply with fibres which are aligned at an acute angle with a length axis of the structure, or a ply with fibres which are aligned at approximately 90° with a length axis of the structure.

All of the internal plies in the curved corner may be discontinuous plies which run from the first section into the second section round the corner and are dropped off in the first and/or second section. However this arrangement is not preferred since it may almost double the thickness of the corner compared with the first and second sections. Therefore more preferably one or more continuous internal plies are sandwiched between the first and second external plies, which run from the first section into the second section round the corner and are not dropped off inside either the first section or the second section.

The external plies and/or each internal ply may have fibres which run in more than one direction—for instance each ply may contain woven or knitted fibres. However more typically each external ply and/or each internal ply contains fibres running in a single direction only.

The structure may further comprise an internal corner reinforcement ply which is sandwiched between the first and second external plies, runs from the second section into the first section round the corner, and is dropped off inside the first section and the second section.

The structure may be formed from dry-fibre pre-forms which are injected with matrix after assembly and consolidation, or from a stack of so-called "prepregs" formed from pre-impregnated fibre layers.

The structure may form part of an aerofoil comprising a pair of skins which form low pressure and high pressure surfaces of the aerofoil; and a pair of spars which join the skins, wherein one of the skins and at least one of the spars are formed by a composite structure according to the invention. The aerofoil may be a wing, a horizontal tail plane, a wing tip device, or a turbine blade. Alternatively the structure may comprise a spar for an aircraft wing, turbine blade or other structure, the first section comprising a flange of the spar and the second section comprising a web of the spar.

A further aspect of the invention provides an aerofoil comprising a pair of skins which form low pressure and high pressure surfaces of the aerofoil; and a pair of spars which join the skins, wherein one of the skins and at least one of the spars are formed by a composite structure according to the invention. In this case preferably the first section comprises a spar of the aerofoil and the second section comprises a skin of the aerofoil.

Various other preferred features are set out in the dependent claims.

BRIEF DESCRIPTION OF THE DRAWINGS

Embodiments of the invention will now be described with reference to the accompanying drawings, in which:

FIG. 5 is a plan view of the omega cover with the spar flanges omitted;

FIG. 6 is a side view of the spar section of the omega cover;

FIG. 7 is an enlarged view of part of the spar showing various fibre angles;

FIG. 12 is a sectional view through one corner of an omega cover according to a further embodiment of the invention; and FIG. 13 is a sectional view through one corner of an omega cover according to a further embodiment of the invention.

DETAILED DESCRIPTION OF EMBODIMENT(S)

Figure 3:
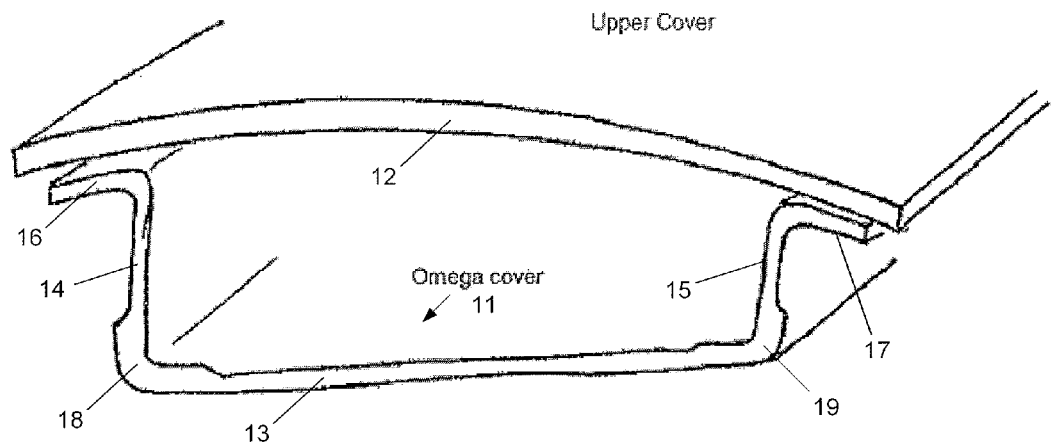
FIG. 3 is a schematic perspective view of a wing box assembly incorporating an omega cover according to an embodiment of the present invention.

FIG. 3 is a schematic perspective view of a wing box 10 according to an embodiment of the invention. The wing box comprises an omega cover 11 and an upper cover (or skin) 12, each comprising a stack of fibre-reinforced plies. The omega cover 11 comprises a lower cover (or skin) section 13, front and rear spars 14,15 and front and rear spar flanges 16,17. The parts 12-17 are formed together as a unitary composite structure. The covers 12,13 form low pressure and high pressure surfaces of the aerofoil, and the spars 14,15 join the covers 12,13 together.

By way of example, the omega cover 11 may be manufactured by laying up a series of "prepreg" plies (each ply comprising a layers of unidirectional carbon fibres pre-impregnated with an epoxy resin matrix) onto a mould tool. The plies may be laid onto the tool by hand, by automated tape laying (ATL), or by fibre placement. The "prepreg" plies are then consolidated and cured by a combination of heat and pressure. The upper cover 12 may be formed in a similar way. The omega cover 11 and upper cover are joined together by fasteners (not shown) passing through the flanges 16,17.

The lower cover 13 is joined to the spars 14,15 by curved corners 18,19. The corners 18,19 are similar so only corner 18 will be described in detail with reference to FIG. 4. A first external ply 20 at one end of the stack runs from the spar 14 into the cover 13 and follows a curved path as it passes round an inside of the corner 18, and a second external ply 21 at an opposite end of the stack to the first external ply runs from the spar 14 into the cover 13 and follows a curved path as it passes round an outside of the corner 18. The external plies 20, 21 are bias plies with fibres which are aligned at +/−45° with a length axis of the structure. More specifically, referring to FIG. 5, the fibres in the external plies 20, 21 are aligned at +/−45 to a cover rosette 23 which is aligned in turn with a length axis 24 which runs from a mid-point of the root of the cover to a mid-point of the tip of the cover. The external plies 20, 21 are continuous plies which are not dropped off in either the cover 13 or the spars 14,15. In other words, they run continuously from the tip of the spar flange 16 to the tip of the opposite spar flange 17.

Figure 4:
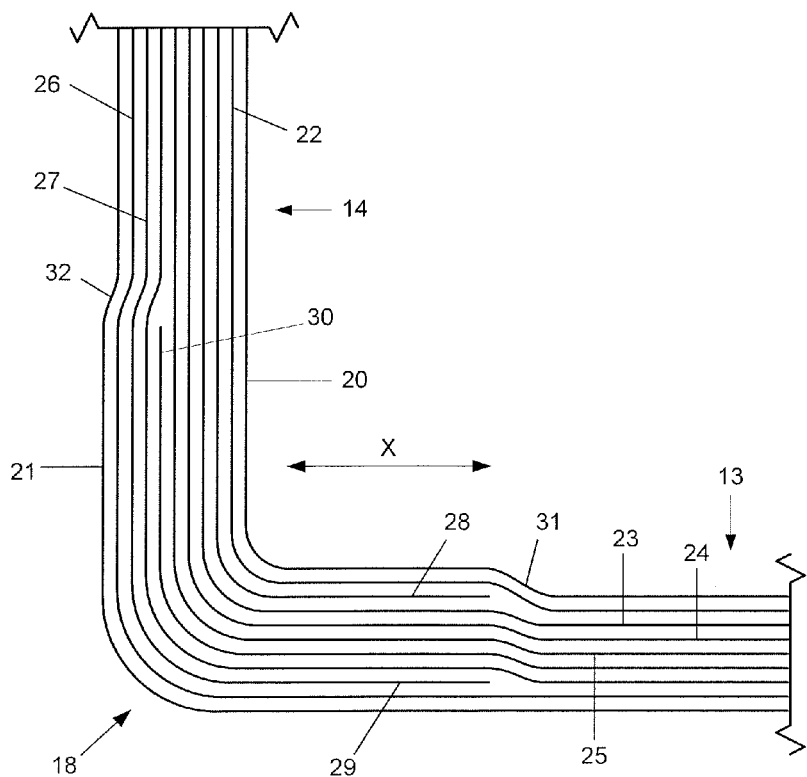
FIG. 4 is a sectional view through one corner of the omega cover.

The omega cover 11 also has a number of internal plies sandwiched between the external plies 20,21. A total of nine internal plies are shown in FIG. 4, but this is merely schematic and more or fewer plies may be provided if required.

Six of the internal plies 22-27 are continuous plies (like the external plies 20,21) which are not dropped off in either the cover 13 or the spars 14,15. In other words, they run continuously from the tip of the spar flange 16 to the tip of the opposite spar flange 17.

Three of the internal plies 28-30 are discontinuous plies which are dropped off in either the spar or the cover. Plies 28,29 each run from the spar section 14 into the cover 13, following a curved path as they pass round the corner 18, and are dropped off inside the cover 13 so that more of each ply is located within the spar than within the cover. Similarly, ply 30 runs from the cover into the spar, following a curved path as it passes round the corner, and is dropped off inside the spar so that more of the ply 30 is located within the cover than within the spar.

Note that the discontinuous plies 28-30 are dropped off without being replaced so that the spar 14 and cover 13 are thinner than the corner 18 (that is, the spar 14 and cover 13 contain fewer plies than the corner 21). Therefore the omega cover 11 has an increased thickness round the corner 18 where the internal plies 28-30 overlap. This increased thickness gives a good load transfer round the corner 18 without a significant weight penalty.

The first external ply 20 has a ramp 31 where the plies 28,29 are dropped off, and the second external ply 21 has a ramp 32 where the ply 30 is dropped off. This ensures that the external ply 21 forms a smooth aerodynamic surface across the cover 13, and the external ply 20 forms a smooth planar surface across the spar 14 to assist in the removal of any internal tooling required to manufacture the omega cover 11.

The clearance distance X between the corner 18 and the ramp 31 is of the order of 30 mm.

The external and internal plies follow a curved path as they pass round the corner 18, so that the portion of each ply in the spar does not lie in the same plane as the portion of the same ply in the cover. The curvature of each ply (and the fibres within it) is relatively low (or zero) within the spar and the cover, and relatively high as it passes round the corner.

It is generally desirable for the cover 13 to have a high proportion of 0° plies (to transfer bending load) so the discontinuous ply 30 will most typically be a 0° ply. An exemplary one of the 0° fibres in the ply 30 is shown at 25 in FIG. 5. In contrast it is generally desirable for the spars to have a high proportion of +/−45° plies so the discontinuous plies 28,29 may be a +45° ply and a −45° respectively. Referring to FIGS. 5 and 6, the 0° fibre 25 runs at an angle Ø to the fold line of the corner 19. The spar rosette 32 is shown in FIG. 6 and is typically aligned with a length axis of the spar. It will be appreciated from FIG. 6 that the 0° fibre 25 is not aligned with the spar rosette 32. The same will be true of any 90° plies or +/−45° bias plies which are aligned with the cover rosette 23—i.e. they also will not be aligned with the spar rosette 32. Typically the degree of misalignment between the rosettes will be of the order of 7°. This presents a problem since there is a significant reduction in the material properties of a composite fibre as it is rotated only small angles. The general rule of thumb is that 90% of the strength is lost after 10° of rotation.

In order to partially deal with this problem, the discontinuous plies 28,29 are oriented with their fibres running along the spar in line with the spar rosette 32 instead of in line with the cover rosette 23. FIG. 7 is an enlarged view of the spar near the spar rosette 32, showing the fibre direction 40 of the plies in the discontinuous +45° ply 28. This fibre direction 40 is at +45° to the spar rosette 32.

In contrast, any +45° plies which are aligned with the cover rosette 23 but not the spar rosette will run along the spar in a direction 41 which is at an angle θ(1) to the fibres in the discontinuous +45° ply 28 at the point where they overlap. In this example the angle θ(1) is of the order of 7°, although it may be higher if required.

Also, the +0° ply 30 (and any other +0° plies which are aligned with the cover rosette 23 but not the spar rosette) will run in a direction 42 which is at an angle θ(2) to the fibres in the discontinuous +45° ply 28 at the point where they overlap. In this example the angle θ(2) is of the order of 38°.

Figure 1:
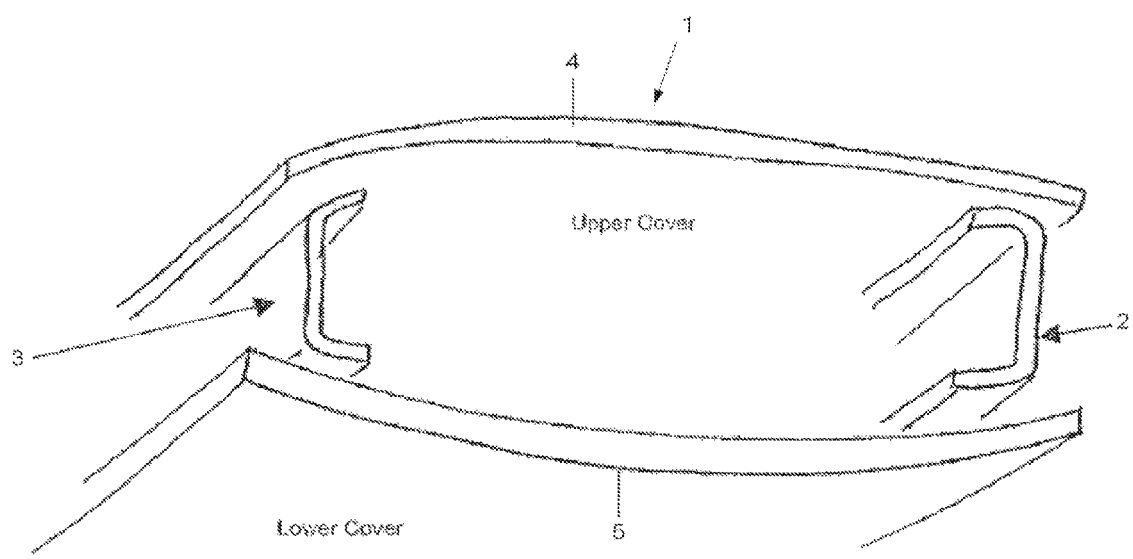
FIG. 1 is a schematic perspective view of a known wing box assembly.
Figure 2:
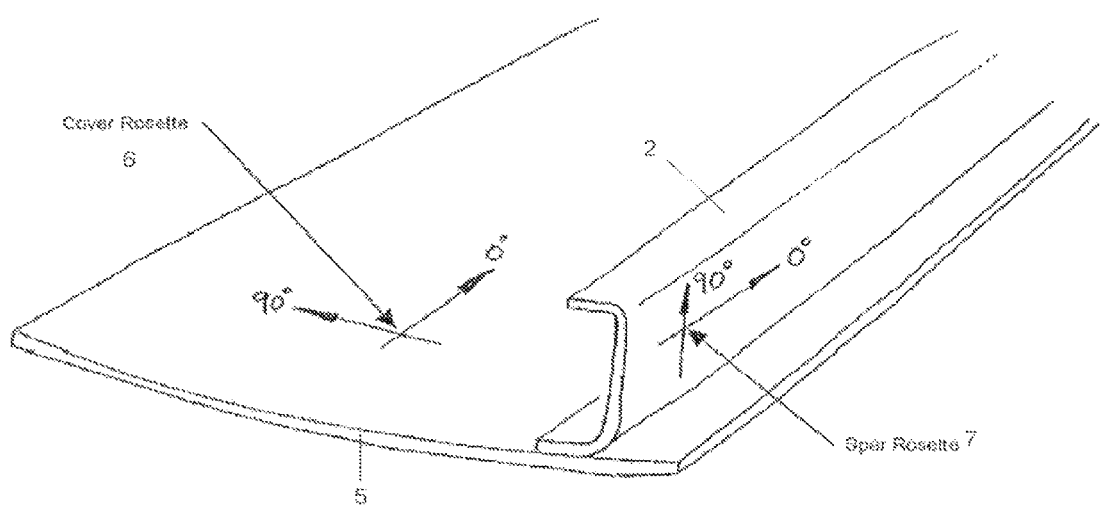
FIG. 2 shows the lower cover and front spar.
Figure 8:
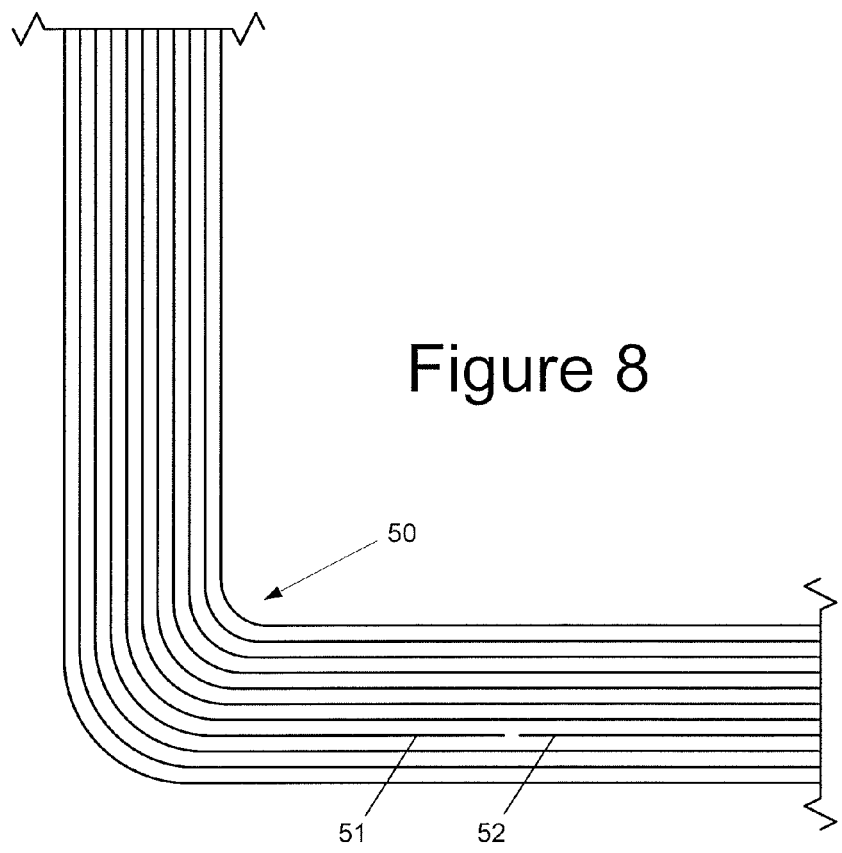
FIG. 8 is a sectional view through one corner of an omega cover according to a further embodiment of the invention.

FIG. 8 shows the layup round a corner of an omega box which is similar to the omega box 10 of FIG. 1, but in which the corner 50 does not have an increased thickness. In this case a first internal ply 51 runs from the spar into the cover section, following a curved path as it passes round the corner 50, and is dropped off inside the cover. A second internal ply 52 is dropped off in the cover where it butts up against the dropped off first internal ply 51.

Figure 9:
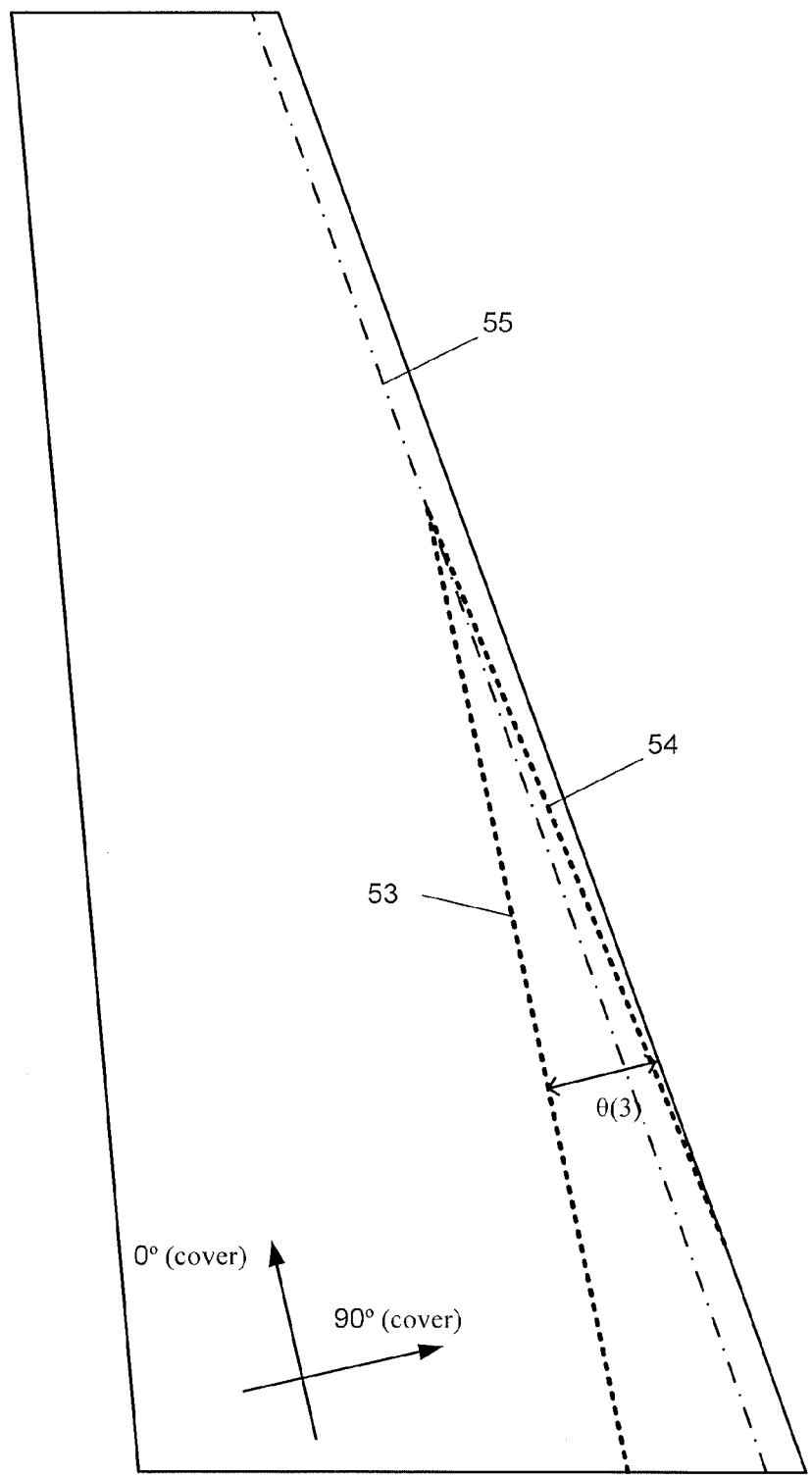
FIG. 9 is a plan view of the omega cover of FIG. 8 with the spar flanges omitted.

The plies 51,52 may both be 0° plies, aligned with the spar rosette and the cover rosette respectively. FIG. 9 is plan view of the cover, showing the fibre direction 53 of the fibres in the ply 52 and the fibre direction 54 of the fibres in the ply 51. FIG. 9 also shows the line 55 along which the two plies 51,52 butt up against each other. As can be seen in FIG. 9, the fibres of the 0° ply 51 are not parallel with the fibres of the 0° ply 52 at the point where the plies butt up against each other. In this case the angle θ(3) between these fibre directions at the point where the plies butt up is of the order of 7°. A similar angle exists between the fibres of the ply 51 and the fibres of any other of the 0° plies in the cover at the point where they overlap at the same point of the stack.

Figure 10:
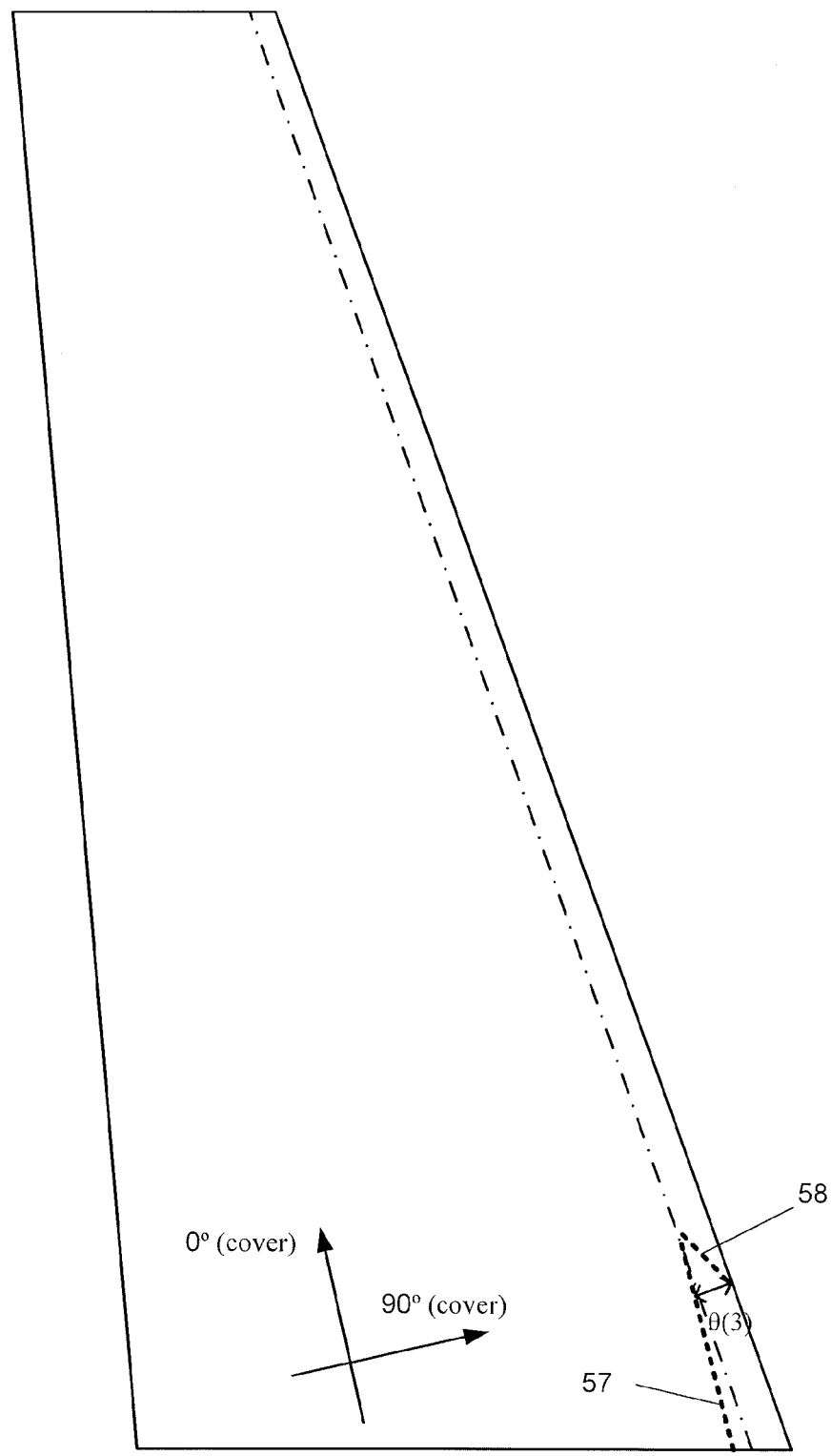
FIG. 10 is a plan view of the omega cover of FIG. 8 with the spar flanges omitted.

Alternatively the ply 52 may be a 0° ply aligned with the cover rosette, and the ply 51 may be a 45° ply aligned with the spar rosette. FIG. 10 is plan view of the cover in this case, showing the fibre direction 57 of the 0° fibres in the ply 52 and the fibre direction 58 of the 45° fibres in the ply 51. The angle θ(4) between these fibre directions at the point where the plies butt up is of the order of 38°. A similar angle exists between the fibres of the ply 51 and the fibres of any other of the 0° plies in the cover at the point where they overlap at the same point of the stack.

Figure 11:
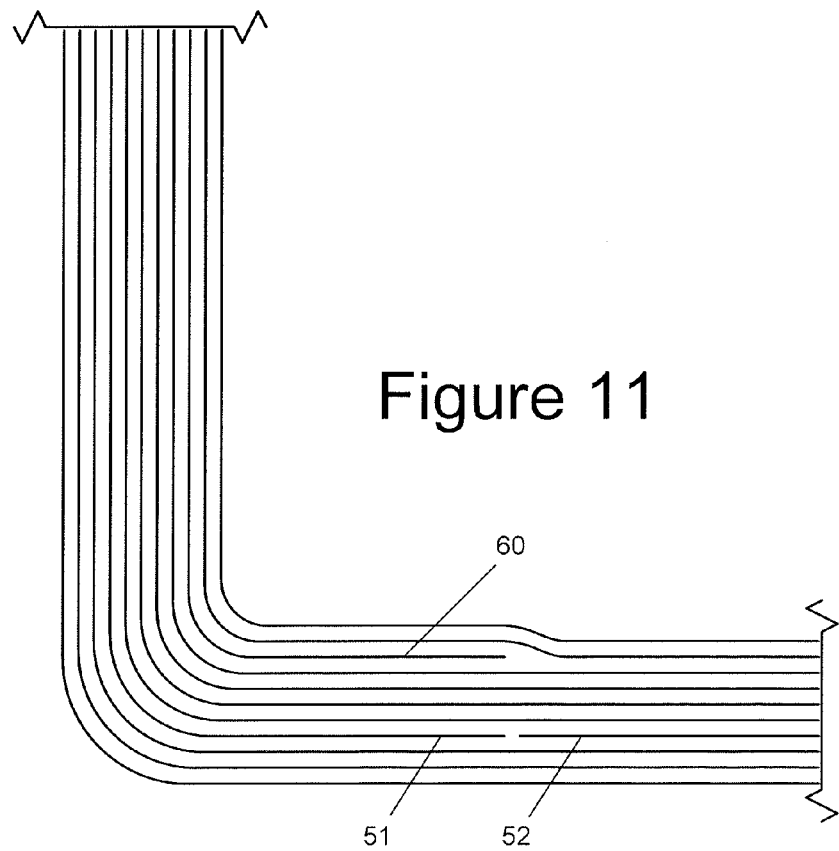
FIG. 11 is a sectional view through one corner of an omega cover according to a further embodiment of the invention.

FIG. 11 shows the layup round a corner of an omega box which is similar to the omega box of FIG. 8, but in which a further discontinuous internal ply 60 is provided. The plies 51,60 may be +/−45° plies aligned with the spar rosette and the ply 52 may be a 0° ply aligned with the cover rosette but not the spar rosette.

FIG. 12 shows the layup round a corner of an omega box which is similar to the omega box of FIG. 11, but in which the further discontinuous internal ply 62 is an internal corner reinforcement ply which is dropped off in both the cover and the spar.

FIG. 13 shows the layup round a corner of an omega box which is similar to the omega box of FIG. 4, but in which the discontinuous ply 30 is replaced by a continuous ply 70.

Although the invention has been described above with reference to one or more preferred embodiments, it will be appreciated that various changes or modifications may be made without departing from the scope of the invention as defined in the appended claims.

The invention claimed is:

1. An aerofoil comprising a pair of skins which form low pressure and high pressure surfaces of the aerofoil; and a pair of spars which join the skins, wherein one of the skins and at least one of the spars are formed by a composite structure comprising a first section; a second section; and a curved corner joining the first section to the second section, the structure comprising a stack of fibre-reinforced plies, the stack including:
  a. a first external ply which runs from the first section into the second section round an inside of the corner;
  b. a second external ply which runs from the first section into the second section round an outside of the corner;
  c. a discontinuous first internal ply which is sandwiched between the first and second external plies and is dropped off inside the structure so that more of the first internal ply is located within one section than within the other section; and
  d. a second internal ply which is sandwiched between the first and second external plies,
wherein at least part of the first and second internal plies are both located within the same section, the fibres of the first internal ply run at an angle $\theta$ to the fibres of the second internal ply in the section where they are both located, and the angle $\theta$ is greater than 3° but less than 20°.

2. The aerofoil of claim 1 wherein the angle $\theta$ is less than 10°.

3. The aerofoil of claim 1 wherein the angle $\theta$ is greater than 5°.

4. The aerofoil of claim 1 wherein the first internal ply is a 0° ply with fibres which are approximately aligned (+/−3°) with a length axis of the one section; and the second internal ply is a 0° ply with fibres which are approximately aligned (+/−3°) with a length axis of the other section.

5. The aerofoil of claim 1 wherein the first section comprises said at least one of the spars and the second section comprises said at least one of the skins.

6. The aerofoil of claim 1 wherein the second external ply forms an aerodynamic surface of said one of the skins.

7. An aircraft wing comprising an aerofoil according to claim 1.

8. An aerofoil comprising a pair of skins which form low pressure and high pressure surfaces of the aerofoil; and a pair of spars which join the skins, wherein one of the skins and at least one of the spars are formed by a composite structure comprising a first section; a second section; and a curved corner joining the first section to the second section, the structure comprising a stack of fibre-reinforced plies, the stack including:
  a. a first external ply which runs from the first section into the second section round an inside of the corner;
  b. a second external ply which runs from the first section into the second section round an outside of the corner;
  c. a discontinuous first internal ply which is sandwiched between the first and second external plies and is dropped off inside the structure so that more of the first internal ply is located within one section than within the other section; and
  d. a second internal ply which is sandwiched between the first and second external plies,
wherein at least part of the first and second internal plies are both located within the same section, the fibres of the first internal ply run at an angle $\theta$ to the fibres of the second internal ply in the section where they are both located, and the angle $\theta$ is between 35° and 42°.

9. The aerofoil of claim 1 wherein the first and second internal plies either overlap with each other or butt up against each other, and wherein the fibres of the first internal ply run at the angle $\theta$ to the fibres of the second internal ply at a point where they overlap or butt up against each other.

10. The aerofoil of claim 1 wherein the first internal ply runs from the first section into the second section round the corner and is dropped off inside the second section so that more of the first internal ply is located within the first section than within the second section; the second internal ply is located at least partially within the second section; and the fibres of the first internal ply in the second section run at the angle $\theta$ to the fibres of the second internal ply in the second section.

11. The aerofoil of claim 10 wherein the second internal ply is a discontinuous ply which runs from the second section into the first section round the corner and is dropped off inside the first section so that more of the second internal ply is located within the second section than within the first section; and wherein the structure has an increased thickness where the first and second internal plies overlap.

12. The aerofoil of claim 10 wherein the second internal ply is a discontinuous ply which butts up against the first internal ply.

13. The aerofoil of claim 1 further comprising a continuous internal ply which is sandwiched between the first and second external plies, runs from the first section into the second section round the corner, and is not dropped off inside either the first section or the second section.

14. The aerofoil of claim 1 wherein the first and second internal plies each contain fibres running in a single direction only.

15. The aerofoil of claim 1 further comprising an internal corner reinforcement ply which is sandwiched between the first and second external plies, runs from the second section into the first section round the corner, and is dropped off inside the first section and the second section.

16. The aerofoil of claim 8 wherein the first and second internal plies either overlap with each other or butt up against each other, and wherein the fibres of the first internal ply run at the angle $\theta$ to the fibres of the second internal ply at a point where they overlap or butt up against each other.

17. The aerofoil of claim 8 further comprising a continuous internal ply which is sandwiched between the first and second external plies, runs from the first section into the second section round the corner, and is not dropped off inside either the first section or the second section.

18. The aerofoil of claim 8 wherein the first and second internal plies each contain fibres running in a single direction only.

19. The aerofoil of claim 8 wherein the first section comprises said at least one of the spars and the second section comprises said one of the skins.

20. The aerofoil of claim 19 wherein the second external ply forms an aerodynamic surface of said one of the skins.

* * * * *